United States Patent
Yoon et al.

(10) Patent No.: US 9,987,899 B2
(45) Date of Patent: Jun. 5, 2018

(54) APPARATUS AND METHOD FOR DETERMINING MOUNTING STATE OF ELECTRONIC CONTROL UNIT OF ELECTRONICALLY CONTROLLED SUSPENSION SYSTEM

(71) Applicant: Hyundai Motor Company, Seoul (KR)

(72) Inventors: Young Sik Yoon, Gyeonggi-do (KR); Jee Yoon Suh, Incheon (KR)

(73) Assignee: Hyundai Motor Company, Seoul (KR)

( * ) Notice: Subject to any disclaimer, the term of this patent is extended or adjusted under 35 U.S.C. 154(b) by 93 days.

(21) Appl. No.: 15/341,049

(22) Filed: Nov. 2, 2016

(65) Prior Publication Data
US 2017/0282667 A1 Oct. 5, 2017

(30) Foreign Application Priority Data
Mar. 30, 2016 (KR) ........................ 10-2016-0038511

(51) Int. Cl.
*B60G 17/019* (2006.01)
*B60G 17/0185* (2006.01)

(52) U.S. Cl.
CPC ... *B60G 17/01908* (2013.01); *B60G 17/0185* (2013.01); *B60G 2400/10* (2013.01); *B60G 2600/08* (2013.01)

(58) Field of Classification Search
CPC .......... B60G 17/01908; B60G 17/0185; B60G 2400/10; B60G 2600/08
See application file for complete search history.

(56) References Cited

U.S. PATENT DOCUMENTS

| 8,060,277 B2* | 11/2011 | Poilbout | B60G 17/0161 280/5.503 |
|---|---|---|---|
| 2005/0113997 A1* | 5/2005 | Kim | B60G 17/0165 701/37 |
| 2008/0306649 A1* | 12/2008 | Im | B60G 17/015 701/29.5 |
| 2009/0062984 A1* | 3/2009 | Poilbout | B60G 17/0161 701/37 |
| 2011/0218707 A1 | 9/2011 | Inoue et al. | |

FOREIGN PATENT DOCUMENTS

| JP | 2009-023624 A | 2/2009 |
|---|---|---|
| JP | 2011-136631 A | 7/2011 |
| JP | 5115624 B2 | 1/2013 |
| KR | 2000-0015704 A | 3/2000 |
| WO | 2010/064291 A1 | 6/2010 |

* cited by examiner

*Primary Examiner* — Nicholas Kiswanto
(74) *Attorney, Agent, or Firm* — Mintz Levin Cohn Ferris Glovsky and Popeo, P.C.; Peter F. Corless

(57) ABSTRACT

An apparatus and a method for determining a mounting state of an electronic control unit (ECU) of an electronic controlled suspension (ECS) system can determine either a normal mounting state or a mounting failure of the ECU of the ECS system. The apparatus for determining the mounting state of the ECU includes: a signal processor receiving a damper velocity of each damper; an integrator calculating an integral of the damper velocity by integrating the damper velocity of each damper received by the signal processor per unit time; a comparator comparing the integral of the damper velocity calculated by the integrator with an actual stroke of each damper; and an index output unit outputting a mounting state of the ECU in the form of an index according to comparison results of the comparator.

10 Claims, 3 Drawing Sheets

APPARATUS AND METHOD FOR DETERMINING MOUNTING STATE OF ELECTRONIC CONTROL UNIT OF ELECTRONICALLY CONTROLLED SUSPENSION SYSTEM

CROSS-REFERENCE TO RELATED APPLICATION

This application claims under 35 U.S.C. § 119(a) the benefit of Korean Patent Application No. 10-2016-0038511, filed on Mar. 30, 2016 in the Korean Intellectual Property Office, the entire contents of which are incorporated by reference herein.

BACKGROUND

(a) Technical Field

The present invention relates to a method for determining a mounting state of an electronic control unit of an electronic controlled suspension system that can determine either a normal mounting state or a mounting failure of the electronic control unit of the electronic controlled suspension system.

(b) Description of the Related Art

In general, suspension systems for vehicles have used various types of springs, such as leaf springs, coil springs, torsion bars, rubber springs, air springs and the like, as well as shock absorbers, but with the development of electronic technology, an electronic controlled suspension (ECS) system has been designed to control vehicle stability so as to avoid an unstable vehicle state, due to factors such as vibrations of a vehicle on a road surface or rolling of the vehicle body while turning.

When vehicle steering or vehicle behavior exceeds certain limits, a vehicle operator may face overturning of the vehicle or other unpredictable risks if the vehicle pulls to one side due to load difference or steering loss. However, a vehicle with an ECS system may secure vehicle stability while turning, braking, and driving by maintaining vertical load on individual tire treads at an appropriate level while driving on an uneven road surface, and may provide passengers with a greater degree of ride comfort and improved vehicle handling by effectively isolating irregular pressure on the road surface occurring during driving.

Such an ECS system includes an electronic control unit (ECU) controlling a plurality of dampers provided on respective wheels of the vehicle, and the ECU typically has a vertical acceleration sensor in the interior thereof so as to sense acceleration in a vertical direction.

Meanwhile, when the ECU of the ECS system is mounted abnormally in the vehicle, errors may occur in calculating the velocity of the dampers due to abnormalities in sensing values sensed by the vertical acceleration sensor, and thus, suspension control may not be performed normally.

SUMMARY

An aspect of the present invention provides a method for determining a mounting state of an electronic control unit (ECU) of an electronic controlled suspension (ECS) system that can effectively determine the normal mounting state or mounting failure of the ECU of the ECS system.

According to an aspect of the present invention, an apparatus for determining a mounting state of an ECU of an ECS system including a plurality of dampers individually provided on respective wheels of a vehicle, a wheel acceleration sensor provided on each front wheel of the vehicle, and the ECU having a vertical acceleration sensor built in an interior thereof and controlling each of the dampers, the apparatus may include: a signal processor receiving a damper velocity of each of the dampers; an integrator calculating an integral of the damper velocity by integrating the damper velocity of each of the dampers received by the signal processor per unit time; a comparator comparing the integral of the damper velocity calculated by the integrator with an actual stroke of each of the dampers; and an index output unit outputting a mounting state of the ECU as an index according to comparison results of the comparator.

When the comparator determines that an integral of the damper velocity of at least one of the dampers is greater than an actual stroke of the corresponding damper, the index output unit may output an abnormal mounting index of the ECU.

When the abnormal mounting index of the ECU is output, the ECS system may enter a failsafe mode.

When the comparator determines that an integral of the damper velocity is less than or equal to the actual stroke of at least one of the dampers, the index output unit may output a normal mounting index of the ECU.

According to another aspect of the present invention, a method for determining a mounting state of an ECU of an ECS system including a plurality of dampers individually provided on respective wheels of a vehicle, a wheel acceleration sensor provided on each front wheel of the vehicle, and the ECU having a vertical acceleration sensor built in an interior thereof and controlling each of the dampers, the method may include steps of: calculating, by a signal processor of the ECU, a damper velocity of each of the dampers; calculating, by an integrator of the ECU, an integral of the damper velocity by integrating the damper velocity of each of the dampers per unit time; and comparing, by a comparator of the ECU, the integral of the damper velocity with an actual stroke of each of the dampers to determine a mounting state of the ECU.

The damper velocity of each of the dampers may be calculated by converting a measured value of the wheel acceleration sensor and a measured value of the vertical acceleration sensor into acceleration values of the respective wheels and integrating a difference between the converted measured values of the wheel acceleration sensor and the vertical acceleration sensor.

When an integral of the damper velocity of at least one of the dampers among the plurality of dampers is greater than an actual stroke of the corresponding damper, it may be determined that the ECU is mounted abnormally.

When the ECU is mounted abnormally, the ECS system may enter a failsafe mode.

When the integral of the damper velocity is less than or equal to the actual stroke of the corresponding damper, it may be determined that the ECU is mounted normally.

A non-transitory computer readable medium containing program instructions executed by a processor can include: program instructions that calculate a damper velocity of each of a plurality of dampers; program instructions that calculate an integral of the damper velocity by integrating the damper velocity of each of the dampers per unit time; and program instructions that compare the integral of the damper velocity with an actual stroke of each of the dampers to determine a mounting state of an electronic control unit (ECU) of an electronic controlled suspension (ECS) system.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
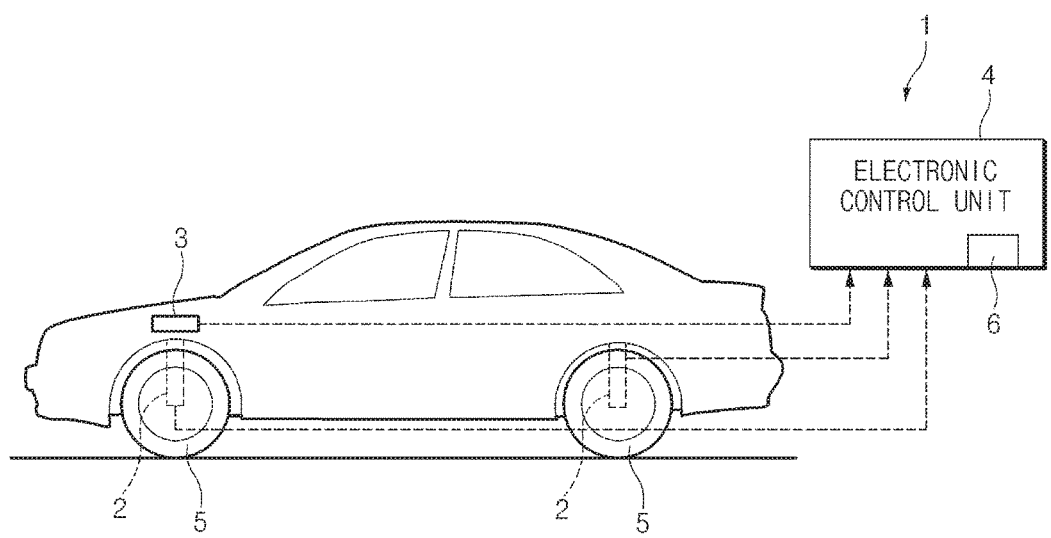
FIG. 1 is a schematic view illustrating an electronic controlled suspension (ECS) system of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present invention will be described in detail with reference to the accompanying drawings. Terms used for describing the present inventive concept have been defined in consideration of the functions of elements, and may be altered in accordance with the intention of a user or an operator, in view of practice, or the like. Therefore, the terms should be defined on the basis of the entirety of this specification.

With reference to FIG. 1, an electronic controlled suspension (ECS) system 1 includes a plurality of dampers 2 individually provided on respective wheels 5 of a vehicle, a wheel acceleration sensor 3 provided on each front wheel of the vehicle, and an electronic control unit (ECU) 4 controlling each of the dampers 2.

The ECU 4 may have a vertical acceleration sensor 6 built in the interior thereof, and may calculate damper velocity by converting a measured value of the wheel acceleration sensor 3 and a measured value of the vertical acceleration sensor 6 into accelerations values of the respective wheels and integrating a difference between the converted measured values of the wheel acceleration sensor 3 and the vertical acceleration sensor 6. Here, damper velocity refers to a velocity at which the damper 2 of each wheel 5 moves in a constant stroke (extension movement). The ECU 4 may control each individual damper 2 by using the calculated damper velocity of each damper 2.

Figure 2:
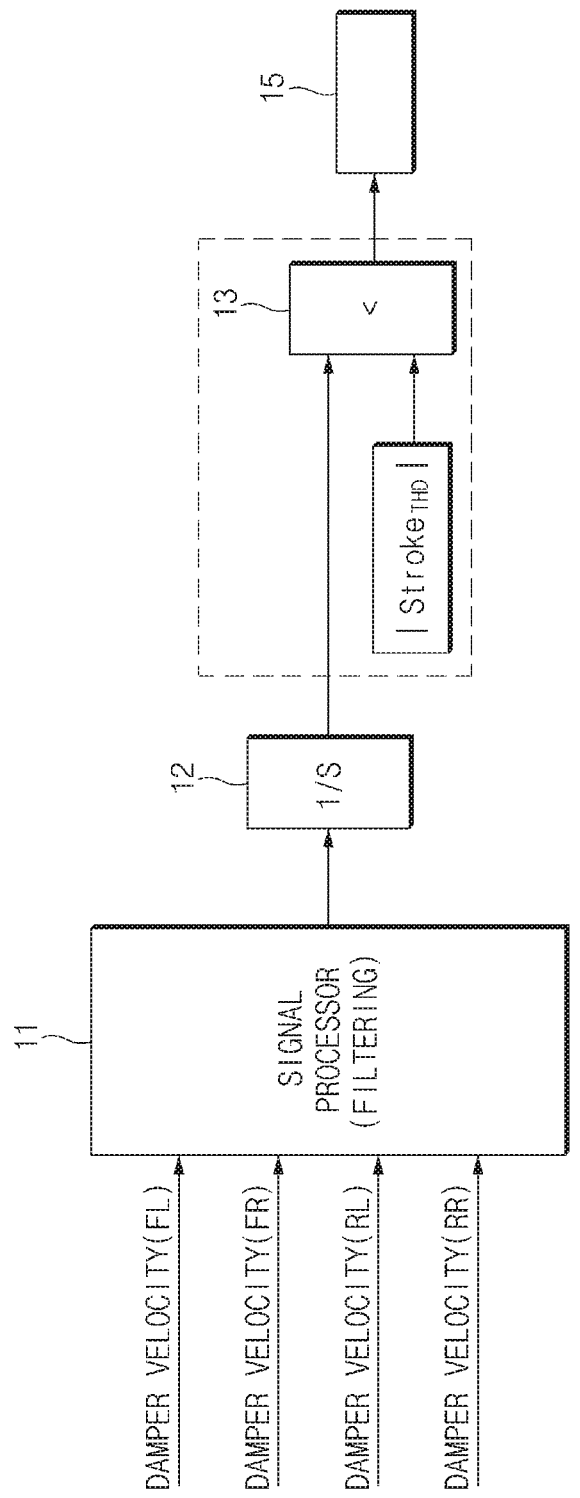
FIG. 2 is a block diagram illustrating an apparatus for determining a mounting state of an electronic control unit (ECU) of the ECS system of FIG. 1 according to an exemplary embodiment of the present invention.

With reference to FIG. 2, an apparatus for determining a mounting state of an ECU of an ECS system, according to exemplary embodiments of the present invention, includes a signal processor 11 receiving a damper velocity of each damper 2, an integrator 12 calculating an integral of the damper velocity, a comparator 13 comparing the integral of the damper velocity calculated by the integrator 12 with an actual stroke ($Stroke_{THD}$) of the corresponding damper, and an index output unit 15 outputting a mounting state of the ECU 4 in the form of an index according to comparison results of the comparator 13.

The signal processor 11 may be configured to individually receive a damper velocity of a damper provided on a front left wheel (FL), a damper velocity of a damper provided on a front right wheel (FR), a damper velocity of a damper provided on a rear left wheel (RL), and a damper velocity of a damper provided on a rear right wheel (RR). In addition, the signal processor 11 may perform appropriate filtering such that the calculation of the integrator 12 can be performed efficiently.

The integrator 12 may calculate an integral of a damper velocity by integrating the damper velocity of each damper received by the signal processor 11 per unit time.

The comparator 13 may compare the integral of the damper velocity received from the integrator 12 with an actual stroke ($Stroke_{THD}$) of each damper 2.

The index output unit 15 may output a mounting state of the ECU 4 in the form of an index according to comparison results of the comparator 13.

When the comparator 13 determines that an integral of a damper velocity of at least one damper among the plurality of dampers is greater than an actual stroke ($Stroke_{THD}$) of the corresponding damper, the index output unit 15 may output an "abnormal mounting index" indicating a state in which the ECU 4 is mounted abnormally. When the "abnormal mounting index" of the ECU 4 is output, the ECS system 1 enters a failsafe mode.

When the comparator 13 determines that the integral of the damper velocity of each damper 2 is less than or equal to the actual stroke ($Stroke_{THD}$) of the corresponding damper 2, the index output unit 15 may output a "normal mounting index" indicating a state in which the ECU 4 is mounted normally, and the ECU 4 may operate normally.

The signal processor 11, the integrator 12, the comparator 13, and the index output unit 15 may be embodied in a controller of the ECU 4.

Figure 3:
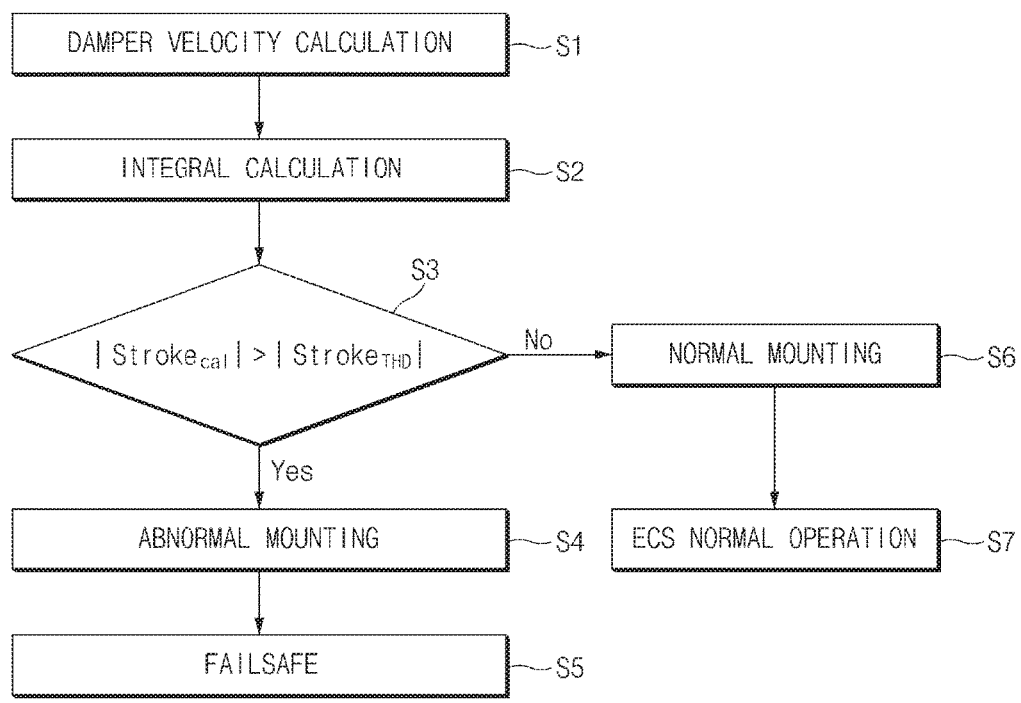
FIG. 3 is a flowchart illustrating a method for determining a mounting state of the ECU of FIG. 1 according to an exemplary embodiment of the present invention.

FIG. 3 is a flowchart illustrating a method for determining a mounting state of an ECU of an ECS system, according to exemplary embodiments of the present invention.

With reference to FIG. 3, the method for determining a mounting state of an ECU of an ECS system, according to exemplary embodiments of the present invention, includes a damper velocity calculation S1, an integral calculation S2, and a comparison operation S3.

In the damper velocity calculation S1, a damper velocity of each individual damper 2 provided on respective wheels 5 may be calculated by converting a measured value of the wheel acceleration sensor 3 and a measured value of the vertical acceleration sensor 6 into accelerations values of the respective wheels and integrating a difference between the converted measured values of the wheel acceleration sensor 3 and the vertical acceleration sensor 6.

In the integral calculation S2, an integral ($Stroke_{cal}$) of the damper velocity may be calculated by integrating the damper velocity of each individual damper 2 per unit time.

In the comparison operation S3, the integral ($Stroke_{cal}$) of the damper velocity may be compared with an actual stroke of the corresponding damper 2 to determine a mounting state of the ECU 4.

In the comparison operation S3, when an integral (an absolute value) of a damper velocity of at least one damper 2 among the plurality of dampers 2 is greater than an actual stroke ($Stroke_{THD}$) of the corresponding damper 2, it is determined in operation S4 that the ECU 4 is mounted abnormally. When it is determined that the ECU 4 is mounted abnormally, the ECS system 1 may enter a failsafe mode in operation S5.

In the comparison operation S3, when the integral ($Stroke_{cal}$) of the damper velocity is less than or equal to the actual stroke ($Stroke_{THD}$) of the corresponding damper 2, it is determined in operation S6 that the ECU 4 is mounted normally, and the ECS system may operate normally in operation S7.

As set forth above, by determining the normal or abnormal mounting state of the ECU of the ECS system through the comparison of the integral of the damper velocity with the actual stroke of the damper, the normal mounting state or mounting failure of the ECU of the ECS system can effectively be determined.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. An electronic control unit (ECU) of an electronic controlled suspension (ECS) system, the ECS system including a plurality of dampers individually provided on respective wheels of a vehicle, a wheel acceleration sensor provided on each front wheel of the vehicle, and the ECU having a vertical acceleration sensor built in an interior thereof and controlling each of the dampers, the ECU comprising executable instructions for determining a mounting state of the ECU, said instructions comprising:

a signal processor receiving a damper velocity of each of the dampers;

an integrator calculating an integral of the damper velocity by integrating the damper velocity of each of the dampers received by the signal processor per unit time;

a comparator comparing the integral of the damper velocity calculated by the integrator with an actual stroke of each of the dampers; and an index output unit outputting a mounting state of the ECU as an index according to comparison results of the comparator.

2. The apparatus according to claim 1, wherein when the comparator determines that an integral of the damper velocity of at least one of the dampers is greater than an actual stroke of the corresponding damper, the index output unit outputs an abnormal mounting index of the ECU.

3. The apparatus according to claim 2, wherein when the abnormal mounting index of the ECU is output, the ECS system enters a failsafe mode.

4. The apparatus according to claim 1, wherein when the comparator determines that an integral of the damper velocity is less than or equal to the actual stroke of at least one of the dampers, the index output unit outputs a normal mounting index of the ECU.

5. A method for determining a mounting state of an electronic control unit (ECU) of an electronic controlled suspension (ECS) system including a plurality of dampers individually provided on respective wheels of a vehicle, a wheel acceleration sensor provided on each front wheel of the vehicle, and the ECU having a vertical acceleration sensor built in an interior thereof and controlling each of the dampers, the method comprising the steps of:

calculating, by a signal processor of the ECU, a damper velocity of each of the dampers;

calculating, by an integrator of the ECU, an integral of the damper velocity by integrating the damper velocity of each of the dampers per unit time; and comparing, by a comparator of the ECU, the integral of the damper velocity with an actual stroke of each of the dampers to determine a mounting state of the ECU.

6. The method according to claim 5, wherein the damper velocity of each of the dampers is calculated by converting a measured value of the wheel acceleration sensor and a measured value of the vertical acceleration sensor into acceleration values of the respective wheels and integrating a difference between the converted measured values of the wheel acceleration sensor and the vertical acceleration sensor.

7. The method according to claim 5, wherein when an integral of the damper velocity of at least one of the dampers is greater than an actual stroke of the corresponding damper, it is determined that the ECU is mounted abnormally.

8. The method according to claim 7, wherein when the ECU is mounted abnormally, the ECS system enters a failsafe mode.

9. The method according to claim 5, wherein when the integral of the damper velocity is less than or equal to the actual stroke of the corresponding damper, it is determined that the ECU is mounted normally.

10. A non-transitory computer readable medium containing program instructions executed by a processor, the computer readable medium comprising:

program instructions that calculate a damper velocity of each of a plurality of dampers;

program instructions that calculate an integral of the damper velocity by integrating the damper velocity of each of the dampers per unit time; and program instructions that compare the integral of the damper velocity with an actual stroke of each of the dampers to determine a mounting state of an electronic control unit (ECU) of an electronic controlled suspension (ECS) system.

* * * * *